United States Patent [19]

Baram

[11] 4,211,361

[45] Jul. 8, 1980

[54] ANNULAR SEAL FOR SELF-CLEANING SLUDGE CENTRIFUGES

[76] Inventor: Martin Baram, 13 Svanholmvej, 2660 Brondby Strand, Denmark

[21] Appl. No.: 948,032

[22] Filed: Oct. 2, 1978

[30] Foreign Application Priority Data

Oct. 14, 1977 [DK] Denmark ............................. 4570/77

[51] Int. Cl.² ............................................... B04B 1/14
[52] U.S. Cl. ..................................... 233/20 A; 233/1 A
[58] Field of Search .................. 233/1 A, 20 R, 20 A, 233/19 R, 47 R, 46

[56] References Cited

U.S. PATENT DOCUMENTS

| 2,487,364 | 11/1949 | Ortenblad | 233/20 A |
|---|---|---|---|
| 3,079,069 | 2/1963 | Thylefors | 233/20 R |
| 3,761,014 | 9/1973 | Carter | 233/20 A |
| 3,823,868 | 7/1974 | Baram | 233/20 A |

FOREIGN PATENT DOCUMENTS 173708 12/1960 Sweden ................................. 233/20 A Primary Examiner—George H. Krizmanich
Attorney, Agent, or Firm—Hubbell, Cohen, Stiefel & Gross

[57] ABSTRACT

The invention pertains to a displaceable annular seal for self-cleaning sludge centrifuges where the sludge contents are ejected through a peripheral slit which is defined upwardly by the upper bowl part, and downwardly by the annular seal which consists of a relatively soft and elastic sealing part and a relatively stiff and hard reinforcement part which are joined by glueing or in a similar manner.

20 Claims, 4 Drawing Figures

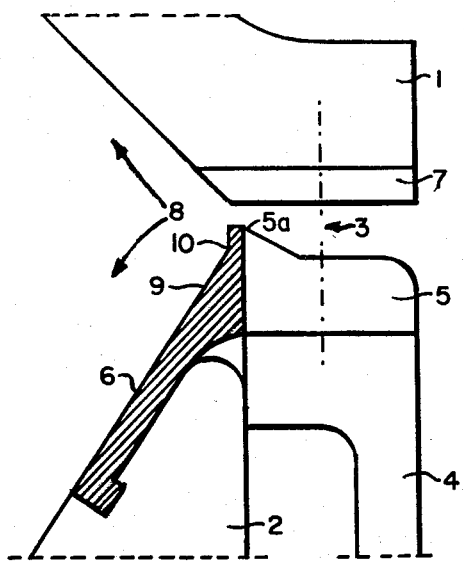
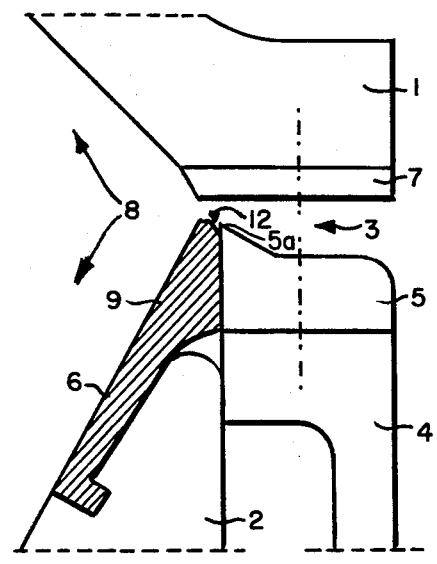
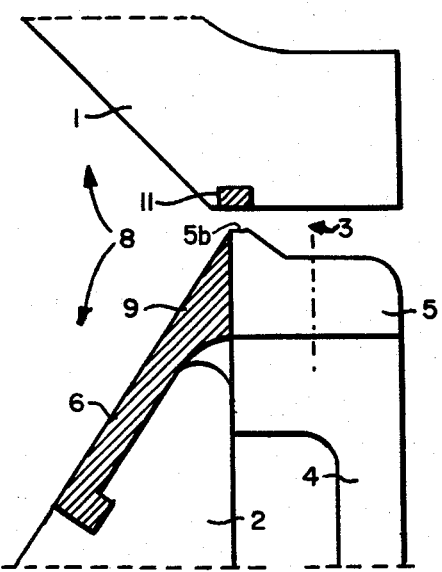
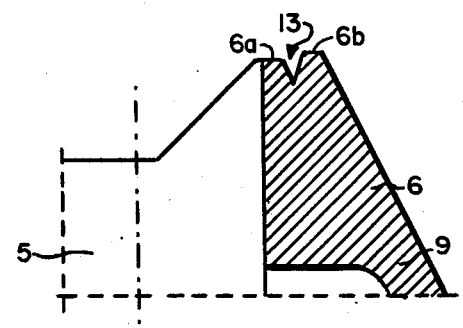

ANNULAR SEAL FOR SELF-CLEANING SLUDGE CENTRIFUGES

BACKGROUND OF THE INVENTION

1. Field of the Invention

The present invention relates to annular seals for self-cleaning sludge centrifuges.

2. Description of the Prior Art

Annular seals for self-cleaning sludge centrifuges are well known, such as shown in Danish Patent No. 127041. The annular seal disclosed in this patent has its soft ring part joined to the reinforcement part in such a way that the soft material covers the reinforcement part's top in such a manner that the soft material seals directly against the upper bowl part when the slit is closed. This arrangement has shown itself to be accompanied by serious drawbacks as the soft material is squeezed between the two hard parts, has a tendency to flow outwardly under the influence of the centrifugal force, and is quickly eroded in its exposed position by the outflowing solid particles. Furthermore, in such an arrangement it is difficult to perform so called "partial shots" because the soft material is not able to "bite" the sludge flows over. These disadvantages of the prior art are overcome by the present invention.

SUMMARY OF THE INVENTION

A displaceable annual seal for self-cleaning sludge centrifuges in which the sludge contents are ejected through a peripheral slit which is defined upwardly by the upper bowl part and downwardly by the lower bowl part and by the annular seal which is mounted on a ring piston, includes a soft elastic sealing part which is fastened to a relatively stiff and hard reinforcement part in the surface which faces the inner space of the centrifuge, with the upper edge of the reinforcement part directly touching the upper bowl part. Such an embodiment has the result that the soft sealing material, which for example may be rubber, is protected against the centrifugal pressure against the reinforcement ring which directly touches the upper bowl part. Thus, the sealing material is not squeezed and cannot flow outwardly. Nevertheless, the soft material seals because, since it cannot be compressed, it is deformed upwardly against the upper bowl part by the fluid pressure in the centrifuge. In most cases, depending on the degree of hardness of the sealing material, the sealing material will, when the slit is opened, move together with the reinforcement ring without flowing over its edge. Thus, it will be lying more or less protected against the erosive effect of the outflowing material.

An important improvement in the annular seal in accordance with the present invention is accomplished by providing a sharpened upper edge for the reinforcement ring. A sharp edge bites well, and offers only a limited area of attack to the hydro-static pressure emanating from the fluid inside the centrifuge which might cause the centrifuge to become leaky. As a result of this preferred arrangement, the forces which keep the centrifuge closed may be kept to a minimum. Both characteristics are important for the performance of a "partial shot". Preferably, the upper edge of the aforementioned reinforcement ring is hardened while the upper bowl part is furnished with a non-hardened erosion ring. If relatively hard sealing materials are employed, it is preferably advantageous to provide the sealing part with a relatively broad upper edge which is on a level with the upper edge of the reinforcement part because such a material cannot be deformed very much. If, instead, relatively soft sealing materials are employed, preferably the sealing part is separated from the reinforcement part by a groove between their respective upper edges or the upper edge of the sealing part is divided by a groove. This arrangement has the advantageous effect that the upper edge of the seal can flow out downwardly into the groove when the slit is open so that it does not flow over the sharp edge of the reinforcement ring, and the upper edge of the seal is raised up by the pressure of the fluid generated in the groove and is pressed against the upper bowl part when the slit is closed. This arrangement also protects the material against erosion. Preferably, the life of the seal may be increased by making the inside edge of the aforementioned groove of the sealing part higher than the upper part of the reinforcement ring. This additional material enhances the dependability of the seal.

Under certain circumstances, it may be beneficial to preferably provide a rounded or relatively broad upper edge for the reinforcement part with the upper bowl part which is opposite to it being furnished with a soft sealing ring. In this manner the collision between the annular seal and the upper bowl part is softened when the centrifuge is closed with great force. When the slit is opened the sealing part is deformed along its surface that adjoins the inner surface of the centrifuge. By this, the sludge lodging in this area is moved and loosened which has the very important effect that the sludge is ejected more easily. In order to enhance this effect the annular seal may preferably be formed with the inner surface of the sealing part forming a concave angle surface against the interior of the centrifuge.

BRIEF DESCRIPTION OF DRAWINGS

FIG. 1 is a fragmentary sectional view, partially diagrammatic, of a preferred embodiment of the present invention, illustrating the preferred sealing ring in section;

FIG. 2 is a sectional view, similar to FIG. 1, of an alternative embodiment of the arrangement shown in FIG. 1;

FIG. 3 is a sectional view, similar to FIG. 1, of another alternative embodiment of the arrangement shown in FIG. 1; and FIG. 4 is a sectional view, similar to FIG. 3, of still another alternative embodiment of the arrangement of FIG. 1 with the upper bowl part removed.

DETAILED DESCRIPTION OF THE PREFERRED EMBODIMENTS

The present invention shall be explained in detail below in connection with the drawings, which in FIGS. 1-4 show parts of a self-cleaning sludge centrifuge together with various preferred embodiments of the annular seal in accordance with the invention in sectional view. Referring now to the drawings in detail, FIGS. 1-3 show an upper bowl part 1 and a lower bowl part 2 with a sludge ejection slit 3 located between the two. The lower bowl part 2 preferably is surrounded by a ring shaped piston 4, which is vertically displaceable relative to lower bowl part 2. Piston 4 preferably carries an annular seal 5-6 consisting of an outer stiff reinforcement ring 5 and an inner relatively soft sealing ring 6. The upper bowl part 1, as shown and preferred in FIG. 1, can be provided at the slit 3 with a replaceable erosion ring 7. The sludge preferably collects in a triangular sludge space 8 which is preferably defined by, among other parts, the inner surface 9 of the sealing ring 6, which in FIG. 1 is preferably shown as having a concave angle area 10 which, by the opening movement of the annular seal, is preferably reshaped into a convex area by which the sludge is loosened. In FIG. 1 the upper edge of the hard reinforcement ring 5 is shown as being sharp, whereas in the embodiment of FIG. 3 it is shown as being rounded and in the embodiment of FIG. 4 as being relatively flat. As illustrated in FIG. 3, by way of example, the embodiments shown in FIGS. 3 and 4 make it possible to employ a seal ring 11 in the upper bowl part 1. As also shown and preferred in FIG. 1, the upper edge of seal ring 6 is on the same level as the upper edge of the reinforcement ring 5. However, as shown and preferred in the embodiments of FIGS. 2 and 4, a groove 12, 13, respectively, is provided between the sealing ring 6 and the reinforcement ring 5, and in the sealing itself. In both cases the sealing ring 6 is shown to preferably extend over the level of the reinforcement ring 5. It is also possible to form the sealing ring 6 on a level with or below the level of the upper edge of the reinforcement ring 5. In all of the aforementioned FIGS. 1–4, the slit 3 is preferably shown open in order to show distinctly the manufacturing shape of the annular seal which, naturally, changes when the slit is closed.

What is claimed is:

1. A displaceable annular seal for a self-cleaning sludge fluid centrifuge where the sludge fluid contents are ejected through a peripheral slit which is defined upwardly by an upper bowl part and downwardly by the lower bowl part and by the annular seal, said annular seal being mounted on a ring piston and comprising a relatively soft and elastic sealing part and a relatively stiff and hard reinforcement part, said soft sealing part being fixedly fastened to said reinforcement part at the surface which faces the inner space of said centrifuge with said hard reinforcement part having an upper edge which directly touches said upper bowl part, said soft sealing part and said hard reinforcement part forming a substantially inseparable unit with said soft sealing part facing said fluid in said centrifuge and being deformable upwardly against said upper bowl part by the fluid pressure in said centrifuge, whereby the sealing of said centrifuge is dependent on the flow of said soft sealing part under the fluid pressure in said centrifuge.

2. Annular seal in accordance with claim 1 wherein said reinforcement ring upper edge is sharpened.

3. Annular seal in accordance with claim 1 wherein said upper edge of said reinforcement ring is hardened and said upper bowl part includes a non-hardened erosion ring.

4. Annular seal in accordance with claim 2 wherein said upper edge of said reinforcement ring is hardened and said upper bowl part includes a non-hardened erosion ring.

5. Annular seal in accordance with claim 1 wherein said sealing part has a relatively broad upper edge which is disposed on a level with said upper edge of said reinforcement part.

6. Annular seal in accordance with claim 2 wherein said sealing part has a relatively broad upper edge which is disposed on a level with said upper edge of said reinforcement part.

7. Annular seal in accordance with claim 3 wherein said sealing part has a relatively broad upper edge which is disposed on a level with said upper edge of said reinforcement part.

8. Annular seal in accordance with claim 1 wherein said sealing part has an upper edge and is separated from said reinforcement part by a groove between said sealing part and said reinforcement part.

9. Annular seal in accordance with claim 2 wherein said sealing part has an upper edge and is separated from said reinforcement part by a groove between said sealing part and said reinforcement part.

10. Annular seal in accordance with claim 3 wherein said sealing part has an upper edge and is separated from said reinforcement part by a groove between said sealing part and said reinforcement part.

11. Annular seal in accordance with claim 4 wherein said sealing part has an upper edge and is separated from said reinforcement part by a groove between said sealing part and said reinforcement part.

12. Annular seal in accordance with claim 1 wherein said sealing part has an upper edge, said upper edge of said sealing part being divided by a groove.

13. Annular seal in accordance with claim 2 wherein said sealing part has an upper edge, said upper edge of said sealing part being divided by a groove.

14. Annular seal in accordance with claim 3 wherein said sealing part has an upper edge, said upper edge of said sealing part being divided by a groove.

15. Annular seal in accordance with claim 4 wherein said sealing part has an upper edge, said upper edge of said sealing part being divided by a groove.

16. Annular seal in accordance with claim 8 wherein said groove has an inside edge with said inside edge of said groove of said sealing part being disposed higher than said upper part of said reinforcement part.

17. Annular seal in accordance with claim 12 wherein said groove has an inside edge with said inside edge of said groove of said sealing part being disposed higher than said upper part of said reinforcement part.

18. Annular seal in accordance with claim 1 wherein said upper edge of said reinforcement part is rounded or relatively broad and said upper bowl part is disposed opposite said reinforcement part upper edge includes a soft sealing ring.

19. Annular seal in accordance with claim 1 wherein said sealing part includes an inner surface which forms a concave angle surface against the interior of said centrifuge.

20. Annular seal in accordance with claim 2 wherein said sealing part includes an inner surface which forms a concave angle surface against the interior of said centrifuge.

* * * * *